United States Patent [19]
Long

[11] Patent Number: 5,872,336
[45] Date of Patent: Feb. 16, 1999

[54] DEVICE FOR THE PROTECTION OF CABLES LAID IN SWITCH CABINETS OR OTHER EQUIPMENT

[75] Inventor: Simon John Long, Abbeymead, United Kingdom

[73] Assignee: Krone Aktiengesellschaft, Berlin-Zehlendorf, Germany

[21] Appl. No.: 500,194

[22] Filed: Jul. 10, 1995

[30] Foreign Application Priority Data

Nov. 1, 1994 [DE] Germany .............................. 9418155 U

[51] Int. Cl.$^6$ ................................................ H02G 15/007
[52] U.S. Cl. ............................................. 174/135; 174/48
[58] Field of Search ................................ 174/48, 83, 135, 174/136

[56] References Cited

U.S. PATENT DOCUMENTS

| | | | |
|---|---|---|---|
| 2,870,242 | 1/1959 | Wilkerson | 174/48 X |
| 4,924,646 | 5/1990 | Marquardt | 174/48 X |
| 5,079,389 | 1/1992 | Nelson | 174/48 |
| 5,280,138 | 1/1994 | Preston et al. | 174/136 X |

FOREIGN PATENT DOCUMENTS

| | | |
|---|---|---|
| 1207610 | 2/1960 | France . |
| 85 05 827.0 | 8/1985 | Germany . |
| 37 38 058 A1 | 5/1988 | Germany . |
| 37 42 448 A1 | 6/1989 | Germany . |

*Primary Examiner*—Hyung S. Sough
*Attorney, Agent, or Firm*—McGlew and Tuttle

[57] ABSTRACT

A device for the protection of cables laid in switch cabinets, other equipment or the like, in order to prevent bends below a minimum bending radius at the exits of cable ducts or similar equipment and that prevents corresponding damages. At the exit openings of cable ducts guiding devices are provided and configured such that they prevent falling below the critical bending radius and that they widen in the direction of exit and are rounded.

12 Claims, 2 Drawing Sheets

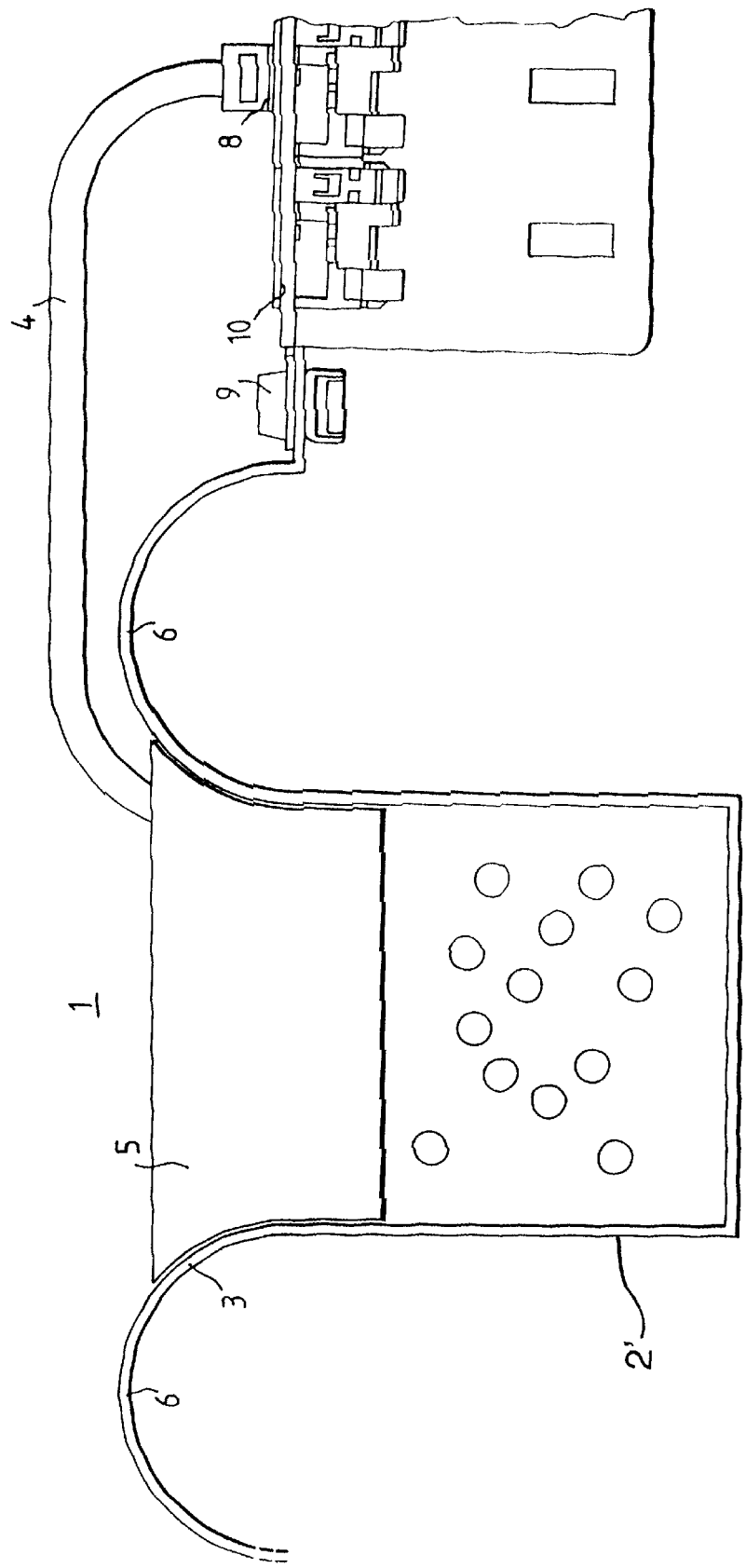

DEVICE FOR THE PROTECTION OF CABLES LAID IN SWITCH CABINETS OR OTHER EQUIPMENT

FIELD OF THE INVENTION

The present invention relates to a device for the protection of cables laid in switch cabinets, other equipment or the like.

BACKGROUND OF THE INVENTION

It is common practice to establish electrically conductive connections by means of cables and plug connectors. The length of the cable is usually minimized. This leads to instances when establishing a connection, i.e. when inserting the plug connector into the terminal position or when laying the cables, that the cables are bent so far that a damage to the core or to the insulation may occur.

SUMMARY AND OBJECTS OF THE INVENTION

The present invention is a device which attaches to the cable ducts of switching cabinets and other cabinets or chassis housing electrical components. The cable duct has an exit opening though which cables lying in the cable duct can exit and travel to their corresponding electrical component. At these exit openings, there is a guide means which prevents the cable from bending further than the minimum recommended bend radius for that particular cable, in order to prevent damage to the cable. The guide means includes a rounded guide element which can be formed in one piece with the cable duct and extends outward from the exit opening along a curve towards a radius larger than or equal to the minimum bending radius of the cable. The guide means also includes a funnel shaped part which is insertable into the exit opening of the cable duct. The funnel shaped part has a substantially straight end which fits into the exit opening and can have a dimension to cause an outside surface of the substantially straight end to snugly contact the inside surface of the cable duct. A flare end of the funnel extends outwardly and the rounded guiding element follows the direction of the flare end. A portion of the guide means, can cover cables inside the cable duct in order to insure that the cables do not fall out of the cable duct.

It is therefore the object of the invention to provide a device that prevents the cables from falling below a minimum bending radius at the exits of cable ducts, or similar equipment, and that prevents corresponding damages.

Such a guiding device widens in the direction of exit and is rounded. The guiding device makes sure by its shape and dimensions that bends smaller than approximately four times the cable diameter are prevented. The guiding device can be at least partially funnel-shaped and can be inserted into the exit opening, which leads to an economical assembly. By corresponding dimensions and/or shape, the guiding device can be secured by positive linkage and/or by friction. Another rounded guiding element can follow the funnel-shaped part, the further guiding element securing a larger section and the full critical section wherein the cables are guided. The device can also be configured such that only the critical section is covered and uncritical local sections are left free.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 a device according to the invention.

DETAILED DESCRIPTION OF THE PREFERRED EMBODIMENT

Figure 1:
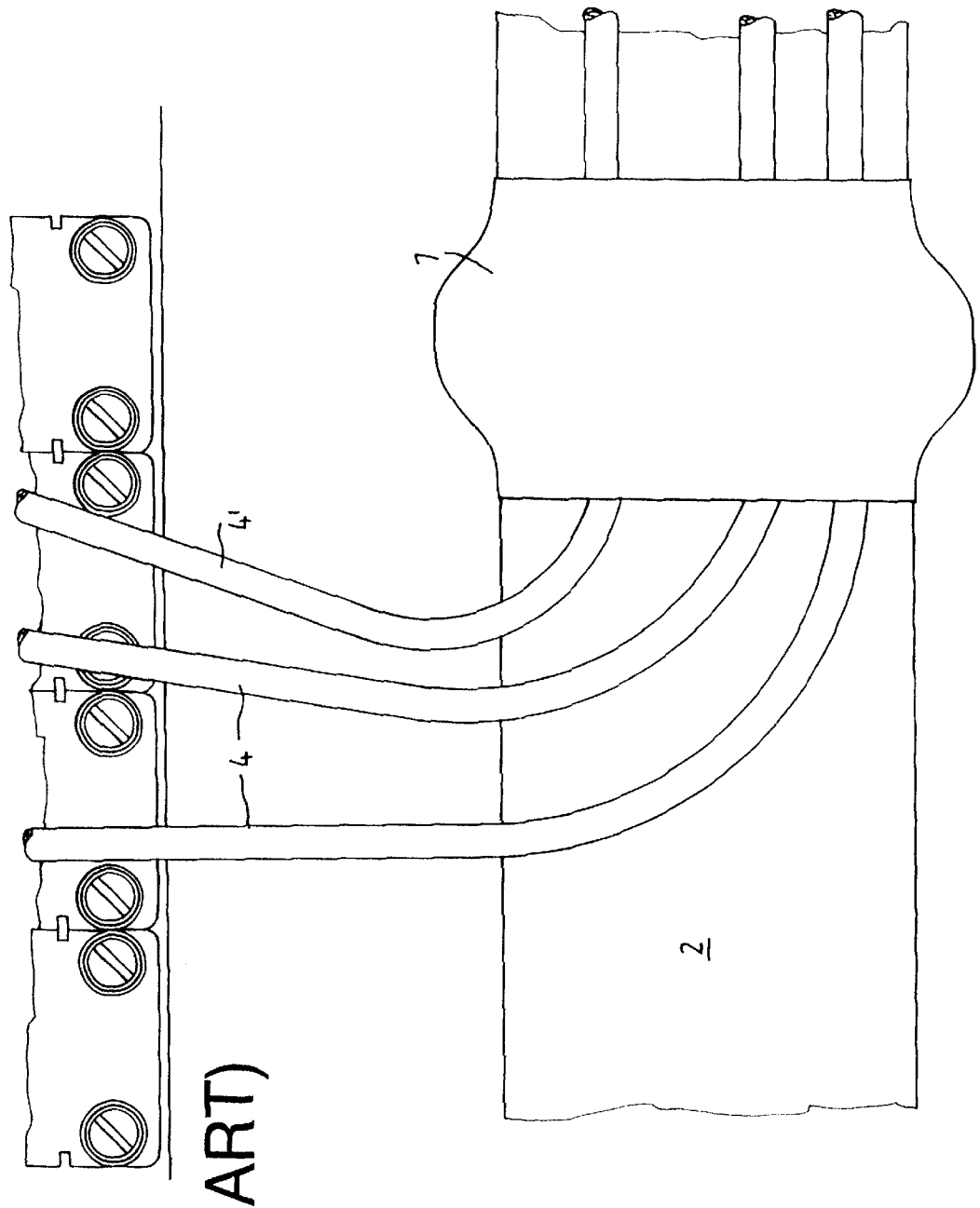
FIG. 1 a conventional cable guiding device.

In the cable guiding system shown in FIG. 1, the cables 4 are held by a displaceable cable guiding device 7 and are guided from a cable duct 2 to terminal positions which are not shown. In this example, the cable 4' is subject to excessive bending, which is more than allowed, and may lead to damages.

In contrast thereto, in the embodiment according to the invention (FIG. 2), a guiding device or means 3 is provided at the exit opening 1. The guiding device prevents the cables 4 from bending below a minimum bending radius. Immediately in the interior of the exit opening 1, a funnel-shaped part 5 is provided. The funnel-shaped part 5 encloses the exit opening 1. Then follows another also rounded guiding element 6, so to shield all sections and to obtain complete protection against overstressing of the cables 4. From the example of the only cable 4, in FIG. 2, guided from the cable duct 2' to a terminal position 8, it can be seen that a smaller bending radius than the minimum bending radius is absolutely prevented. The rounded guiding element 6 is, in this embodiment, an integral part of the exit opening 1. It can, however, also be a separate part to be connected with the cable duct 2 for fitting later. A fixing device 9 of the guiding element 6 at the panel 10 where the terminals 8 are provided will lead to satisfactory fixation, and damages are prevented even with high loads, since the minimum radius is always maintained.

While specific embodiments of the invention have been shown and described in detail to illustrate the application of the principles of the invention, it will be understood that the invention may be embodied otherwise without departing from such principles.

What is claimed is:

1. A device for protecting cable, comprising:
    a cable duct with an exit opening, said cable duct having cables extending therethrough;
    guiding means positioned at said exit opening of said cable duct, said guiding means having a limiting surface for limiting an extent of bending of a cable exiting through said exit opening to a magnitude less than a minimum bending radius of the cable, said guiding means including a rounded guiding element extending at least partially along a peripheral edge of said exit opening, said rounded guiding element including portions which are rounded and widen as said portions extend from said exit opening and
    a funnel shaped part disposed at said exit opening, said funnel shaped part having a surface portion joining said rounded portion to provide said limiting surface.

2. A device according to claim 1, wherein:
    said funnel shaped part includes a substantially straight end inserted into said exit opening of the cable duct, said funnel part also including a flare end expanding outward from said exit opening of the cable duct.

3. A device according to claim 2, wherein:
    an outside of said substantially straight end of said funnel part is in contact with opposite inside surfaces of the cable duct.

4. A device according to claim 1, wherein:

said rounded guiding element is connected to the cable duct and encloses said funnel shaped part, said rounded guiding element extending along side said funnel shaped part and in a direction of said funnel shaped part.

5. A device according to claim 4, wherein:

said rounded guiding element includes a fixing means for fastening said rounded guiding element to a panel.

6. A device according to claim 1, wherein:

said guiding means also covers a section where the cable is guided.

7. A device according to claim 1, wherein:

said guiding means is insertable into said exit opening.

8. A device according to claim 1, wherein:

said funnel shaped part covers a portion of the cable in the cable duct.

9. A device according to claim 1, wherein: said rounded guiding element is formed integrally with said cable duct.

10. A device for guiding and protecting cable, the device comprising:

a cable duct defining an exit opening on one side;

guide means positioned at said exit opening, said guide means for blocking bending of a cable exiting through said exit opening to a magnitude less than a minimum bending radius of the cable, said guide means including a rounded guiding element formed with said cable duct, said rounded guiding element including portions which widen and are rounded as said portions extend from said exit opening, said guide means also including a funnel shaped part with a substantially straight end insertable into said exit opening of the cable duct, said funnel part also including a flare end expanding outward from said exit opening of the cable duct, an outside of said substantially straight end of said funnel part being contactable with opposite inside surfaces of said cable duct, said rounded guiding element enclosing said funnel shaped part, said rounded guiding element extending along side said funnel shaped part and in a direction of said funnel shaped part.

11. A device according to claim 10, wherein: said rounded guiding element is formed integrally with said cable duct.

12. A device for protecting cable, comprising:

a cable duct with an exit opening, said cable duct having cables extending therethrough;

guiding means positioned at said exit opening of said cable duct, said guiding means having a limiting surface for limiting an extent of bending of a cable exiting through said exit opening to a magnitude less than a minimum bending radius of the cable, said guiding means including;

a rounded guiding element formed integrally with said cable duct, said rounded guiding element extending at least partially along a peripheral edge of said exit opening, said rounded guiding element including portions which are rounded and widen as said portions extend from said peripheral edge exit opening; and a funnel shaped part disposed at said exit opening, said funnel shaped part having a surface potion joining said rounded portion to provide said limiting surface, said funnel shaped part including a substantially straight end inserted into said exit opening of the cable duct, said funnel part also including a flare end expanding outwardly from said exit opening of the cable duct, an outside of said substantially straight end of said funnel part being in contact with opposite inside surfaces of the cable duct.

* * * * *